(12) United States Patent
Takahashi et al.

(10) Patent No.: US 9,860,486 B2
(45) Date of Patent: Jan. 2, 2018

(54) COMMUNICATION APPARATUS, COMMUNICATION METHOD, AND COMMUNICATION SYSTEM

(71) Applicants: Masato Takahashi, Tokyo (JP); Hiroaki Uchiyama, Kanagawa (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP)

(72) Inventors: Masato Takahashi, Tokyo (JP); Hiroaki Uchiyama, Kanagawa (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/218,137

(22) Filed: Jul. 25, 2016

(65) Prior Publication Data
US 2017/0041570 A1 Feb. 9, 2017

(30) Foreign Application Priority Data
Aug. 3, 2015 (JP) .................................. 2015-153374

(51) Int. Cl.
*H04N 7/14* (2006.01)
*H04N 7/15* (2006.01)
(Continued)

(52) U.S. Cl.
CPC ........... *H04N 7/15* (2013.01); *H04N 5/23238* (2013.01); *H04N 5/2628* (2013.01); *H04N 7/142* (2013.01)

(58) Field of Classification Search
None
See application file for complete search history.

(56) References Cited

U.S. PATENT DOCUMENTS 6,429,856 B1    8/2002   Omura et al.
9,332,225 B2 *  5/2016   Wu .......................... H04N 7/152
(Continued)

FOREIGN PATENT DOCUMENTS

JP    2007-235969    9/2007
JP    2007-274463    10/2007
JP    5028944        7/2012

*Primary Examiner* — Maria El-Zoobi
(74) *Attorney, Agent, or Firm* — Cooper & Dunham LLP

(57) ABSTRACT

An apparatus includes: an acquirer acquiring an image; a locator that, upon receiving coordinate information of a specified area being a part of a video displayed on an output device connected to the other apparatus, locates coordinates on the image corresponding to the coordinate information based on association information, in which coordinates on the video and coordinates on the image are associated; a cropping part that crops, from the image, an image of an area defined by the coordinates on the image; a controller that controls directionality of a microphone array including a plurality of microphones on the apparatus so that the directionality of one microphone related to the coordinates on the image is focused to a position indicated by the coordinate on the image; and a first transmission controller that controls transmitting output information containing the cropped image and voice captured with the controlled directionality to the other apparatus.

8 Claims, 8 Drawing Sheets

(51) Int. Cl.
*H04N 5/232* (2006.01)
*H04N 5/262* (2006.01)

(56) References Cited

U.S. PATENT DOCUMENTS

| | | | |
|---|---|---|---|
| 2005/0081160 A1* | 4/2005 | Wee | G06Q 10/10 715/755 |
| 2006/0251384 A1* | 11/2006 | Vronay | G11B 27/034 386/242 |
| 2008/0218582 A1* | 9/2008 | Buckler | H04N 7/15 348/14.08 |
| 2009/0015658 A1* | 1/2009 | Enstad | H04N 5/232 348/14.08 |
| 2012/0274733 A1 | 11/2012 | Yano | |
| 2014/0376740 A1 | 12/2014 | Shigenaga et al. | |
| 2015/0054791 A1 | 2/2015 | Omura | |
| 2015/0109401 A1 | 4/2015 | Kasatani et al. | |

* cited by examiner

| A | B | C | D | A' | B' | C' | D' |
|---|---|---|---|----|----|----|----|
| (Xa, Ya) | (Xb, Yb) | (Xc, Yc) | (Xd, Yd) | (Xa', Ya') | (Xb', Yb') | (Xc', Yc') | (Xd', Yd') |
| ⋮ | ⋮ | ⋮ | ⋮ | ⋮ | ⋮ | ⋮ | ⋮ |

COMMUNICATION APPARATUS, COMMUNICATION METHOD, AND COMMUNICATION SYSTEM

CROSS-REFERENCE TO RELATED APPLICATIONS

The present application claims priority under 35 U.S.C. §119 to Japanese Patent Application No. 2015-153374, filed Aug. 3, 2015. The contents of which are incorporated herein by reference in their entirety.

BACKGROUND OF THE INVENTION

1. Field of the Invention

The present invention relates generally to communication apparatuses, communication methods, and communication systems.

2. Description of the Related Art

One known form of communication systems, in which a plurality of communication apparatuses exchange data, is a video (television) conferencing system that implements remote conferencing by making use of a communication network. The video conferencing system allows conferencing between remote locations in a fashion analogous to that in actual conferencing by converting an image and voice (e.g., speech) in a conference room where one party of conference audiences and the like of the remote conference is, into digital data using a communication apparatus (conference terminal) of the remote video conferencing system, transmitting the digital data to a communication apparatus of the other party, displaying the image on a display in a conference room of the other party, and outputting the voice from a loudspeaker in the conference room of the other party.

Such a video conferencing system typically uses a microphone to capture voice of conference participants and uses a camera to acquire an image of the same. However, because a camera has its angle of view, an image of conference participants out of the angle of view of the camera cannot be captured. As a method for solving this problem, a method that uses a panoramic camera capable of capturing a panoramic image of 360-degree surroundings is known. Meanwhile, a normal microphone is not directional and therefore undesirably collects surrounding sounds other than speech of a participant. As a method for solving this problem, a method that uses a microphone array to make a sound-capture area of the microphones directional, thereby reducing sound collected from surroundings and clearly recording the speech of the participant is known. For example, Japanese Unexamined Patent Application Publication No. 2007-274463 (Patent Document 1) discloses a method for forming, by a conference terminal, a sound collection beam in accordance with a selected pattern of participants' arrangement. Japanese Patent No. 5028944 (Patent Document 2) discloses a technique of detecting a direction, in which a speaker is, using a microphone array formed by arranging a plurality of microphones in an array and causing a camera's image capture direction to track the direction.

A method for implementing more-realistic video conferencing may be provided using a combination of the above-described panoramic camera and the microphone array by capturing an image of an entire conference room with the panoramic camera and, when a speaker is in the room, automatically displaying a close-up video of the speaker and steering a microphone's sound collection area toward the speaker. However, while this combination allows displaying a close-up video of the speaker and steering the microphone's sound collection area toward the speaker, displaying a cropped image of only the speaker and outputting voice of only the speaker are not always desired by a communication apparatus of the other party of the conference. Hence, this combination is disadvantageous in that it is difficult to provide an image and voice that are desired from the communication apparatus of the other party.

Therefore, there is a need to provide a communication apparatus, a communication method, and a communication system capable of (or for) providing an image and voice that are desired from a communication apparatus of the other party in mutual communication.

SUMMARY OF THE INVENTION

Exemplary embodiments of the present invention, there is provided a communication apparatus comprising: an acquirer configured to acquire a captured image; a locator configured to, upon receiving coordinate information representing coordinates of a specified area from another communication apparatus in communication with the communication apparatus, the specified area being a part of a displayed video displayed on an output device connected to the other communication apparatus, locate coordinates on the image corresponding to the coordinate information based on association information, in which coordinates on the displayed video and coordinates on the image are associated; a cropping part configured to crop, from the image, an image of an area defined by the coordinates on the image located by the locator; a directionality controller configured to control directionality of a microphone array including a plurality of microphones mounted and distributed on the communication apparatus so that the directionality of one microphone, to which the coordinates on the image located by the locator are related, of the plurality of microphones, is focused to a position indicated by the coordinate on the image; and a first transmission controller configured to perform control for transmitting output information containing a cropped image, the cropped image being the image cropped by the cropping part, and voice captured with the directionality controlled by the directionality controller to the other communication apparatus.

Exemplary embodiments of the present invention also provide a communication method to be performed by a communication apparatus, the communication method comprising: acquiring a captured image; locating, upon receiving coordinate information representing coordinates of a specified area from another communication apparatus in communication with the communication apparatus, the specified area being a part of a displayed video displayed on an output device connected to the other communication apparatus, coordinates on the image corresponding to the coordinate information based on association information, in which coordinates on the displayed video and coordinates on the image are associated; cropping, from the image, an image of an area defined by the coordinates on the image located at the locating; controlling directionality of a microphone array including a plurality of microphones mounted and distributed on the communication apparatus so that the directionality of one microphone, to which the coordinates on the image located at the locating are related, of the plurality of microphones, is focused to a position indicated by the coordinates on the image; and performing control for transmitting output information containing a cropped image, the cropped image being the image cropped at the cropping, and voice captured with the directionality controlled at the controlling directionality to the other communication apparatus.

Exemplary embodiments of the present invention also provide a communication system comprising: a first communication apparatus; and a second communication apparatus configured to exchange data with the first communication apparatus, the first communication apparatus including an acquirer configured to acquire a captured image, a locator configured to, upon receiving coordinate information representing coordinates of a specified area from the second communication apparatus, the specified area being a part of a displayed video displayed on an output device connected to the second communication apparatus, locate coordinates on the image corresponding to the coordinate information based on association information indicating association relationship between coordinates on the displayed video and the coordinates, a cropping part configured to crop, from the image, an image of an area defined by the coordinates on the image located by the locator, a directionality controller configured to control directionality of a microphone array including a plurality of microphones mounted and distributed on the first communication apparatus so that the directionality of one microphone, to which the coordinates located on the image by the locator are related, of the plurality of microphones, is focused to a position indicated by the coordinates on the image, and a first transmission controller configured to perform control for transmitting output information containing a cropped image, the cropped image being the image cropped by the cropping part, and voice captured with the directionality controlled by the directionality controller to the second communication apparatus, and the second communication apparatus including a second transmission controller configured to perform control for transmitting the coordinate information to the first communication apparatus, and an output controller configured to perform control for outputting the output information received from the first communication apparatus.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
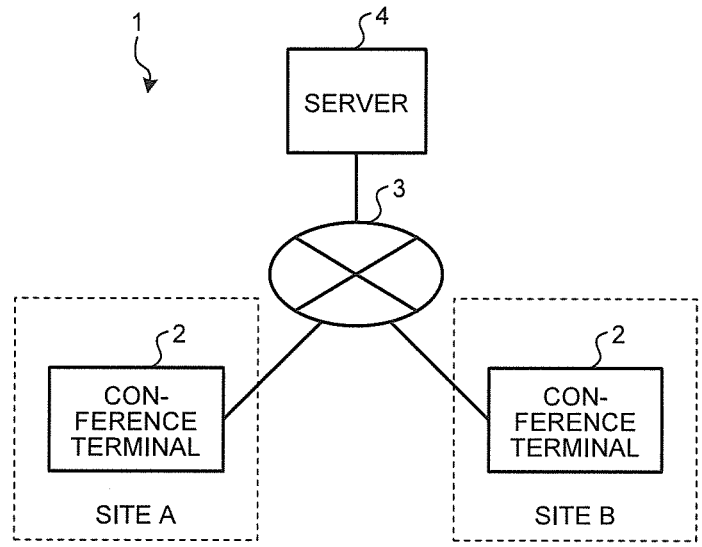
FIG. 1 is a diagram illustrating an example of a configuration of a communication system of an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings.

FIG. 1 is a diagram illustrating an example of a configuration of a communication system 1 of an embodiment of the present invention. Referring to the example illustrated in FIG. 1, a conference terminal 2, which is an example of "communication apparatus", is arranged at each of a site A and a site B. The conference terminals 2 arranged at the site A and the site B in the respective fashion are connected to a server 4 via a network 3, such as the Internet. The number of the conference terminals 2 (i.e., the number of the sites) included in the communication system 1 is not limited to that of this example can be changed as desired.

The server 4 monitors whether or not each of the conference terminals 2 is connected to the server 4 and performs control necessary for conferencing. For example, the server 4 calls the conference terminals 2 at start of a conference. During a conference, the conference terminal 2 transmits image data and voice data acquired in its own terminal to the server 4; the server 4 transmits the image data and the voice data to the other conference terminal 2 of the other party of the conference. The conference terminal 2 receives image data and voice data from the other conference terminal 2 of the other party via the server 4. For example, in a situation where a conference is held between the site A and the site B, data transmitted from the conference terminal 2 at the site A is transmitted to the conference terminal 2 at the site B via the server 4 but not to the other conference terminals 2 (i.e., the conference terminals 2 that are not participating in the conference). Similarly, data transmitted from the conference terminal 2 at the site B is transmitted to the conference terminal 2 at the site A via the server 4 but not to the other conference terminals 2 that are not participating in the conference. By performing control in this manner, a conference can be held between the plurality of conference terminals 2 (i.e., between the plurality of sites).

Figure 2:
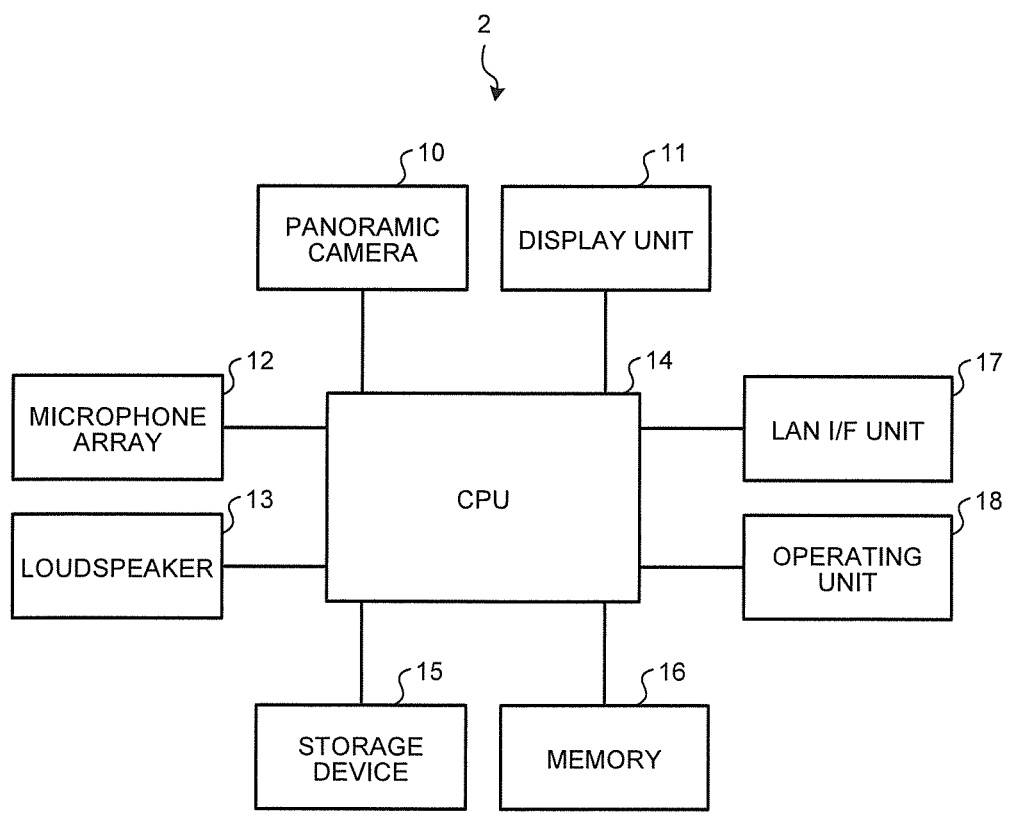
FIG. 2 is a diagram illustrating an example of a hardware architecture of a conference terminal included in the communication system.

A configuration of the conference terminal 2 is described below. Because the conference terminals 2 arranged at the site A and the site B in the respective fashion are identical in configuration, the description is made through an example of one of the conference terminals 2. FIG. 2 is a diagram illustrating an example of a hardware architecture of the conference terminal 2. As illustrated in FIG. 2, the conference terminal 2 includes a panoramic camera 10, a display unit 11, a microphone array 12, a loudspeaker 13, a CPU (central processing unit) 14, a storage device 15, a memory 16, a LAN (local area network) I/F (interface) unit 17, and an operating unit 18.

The panoramic camera 10 creates a panoramic image, in which 360-degree surroundings (which is substantially 360-degree surroundings of the conference terminal 2) of the panoramic camera 10 are captured, and transmits the created panoramic image to the CPU 14. For example, the panoramic camera 10 may be a known spherical camera or the like. By capturing an image of 360-degree surroundings of the panoramic camera 10, all the conference participants in the surroundings of the panoramic camera 10 can be captured in the image. The panoramic image referred to herein is an image created by combining a plurality of images captured by moving a single camera, by using a camera having a plurality of imaging devices, or by using a plurality of cameras. In this example, the image capture range of the panoramic image is 360 degrees; however, the image capture range may be narrower than this. Although a panoramic image is employed in the present embodiment, an image of a narrower angle of view may alternatively be employed. Still, it is preferable to employ a panoramic image.

The display unit 11 has a function of displaying video data received from the CPU 14. In this example, a liquid crystal display device or the like is used as the display unit 11.

The microphone array 12 includes a plurality of microphones mounted and distributed on the conference terminal 2 and has a function of capturing voice data of conference participants and transmitting the voice data to the CPU 14. A microphone array is made up of a plurality of omnidirectional microphones to obtain directionality by beam forming. Generally, beam forming is a method of obtaining directionality by making use of time difference of arrival of sound at the microphones. It is possible to steer the directionality obtained by beam forming in the vertical direction or the horizontal direction using a layout of the microphones. Accordingly, it is possible to change an area (target area), from which sound is to be collected, as desired.

Figure 3:
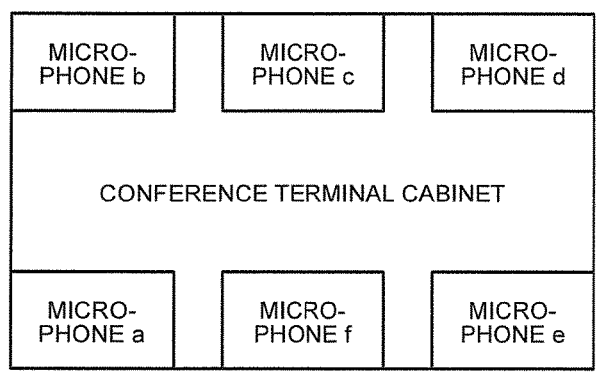
FIG. 3 is a diagram illustrating an example layout of microphones.

FIG. 3 is a diagram illustrating an example layout of six microphones (a to f) included in the microphone array 12 in a cabinet of the conference terminal 2. The CPU 14 can collect sound of a desired area by switching the state of each of the microphones between enabled and disabled and accumulating voices captured by the microphones. Relationship between the microphones and their layout in the cabinet of the conference terminal 2 is stored in the storage device 15 of the conference terminal 2 in advance.

The remaining description of FIG. 2 is given below. The loudspeaker 13 has a function of outputting voice data received from the CPU 14. The CPU 14 performs centralized control of operations of the entire conference terminal 2. For example, the CPU 14 has a function of controlling a video conference and a CODEC (COder/DECoder) function of encoding video data acquired from the panoramic camera 10 and voice data acquired from the microphone array 12, transmitting the encoded data to the LAN I/F unit 17, decoding video data and voice data fed from the other party of the conference and received at the LAN I/F unit 17, and transmitting the decoded data to the display unit 11 and the loudspeaker 13. Example CODEC standards to be used by the CPU 14 include the H.264/AVC standard and the H.264/ SVC standard. The CPU 14 further has a function of controlling the directionality of the microphone array 12, a function of displaying a close-up image of a speaker, who is one of conference participants captured in the panoramic image acquired from the panoramic camera 10, and the like.

The storage device 15 stores various control program instructions (for controlling a video conference, for example) to be executed by the CPU 14, a conversion parameter, which will be described later, and the like. Examples of the storage device 15 include a non-volatile storage medium, such as a flash memory and an HDD (hard disk drive).

The memory 16 is used to load program instructions to be executed by the CPU 14 therein. The memory 16 also temporarily stores operations data. Examples of the memory 16 include a volatile memory, such as a DDR (double data rate) memory. The LAN I/F unit 17 connects the conference terminal 2 to another one of the conference terminals 2 via the network 3 and exchanges data (image data and voice data). Examples of the LAN I/F unit 17 include a wired LAN I/F compliant with 10Base-T, 100Base-TX, and 1000Base-T standards for Ethernet (registered trademark) connection and a wireless LAN I/F compliant with 802.11a/b/g/n/ac standards.

The operating unit 18 is a device used by a user to perform various operations (various operations related to device control of the conference terminal 2) and includes, for example, a keyboard and a button.

Figure 4:
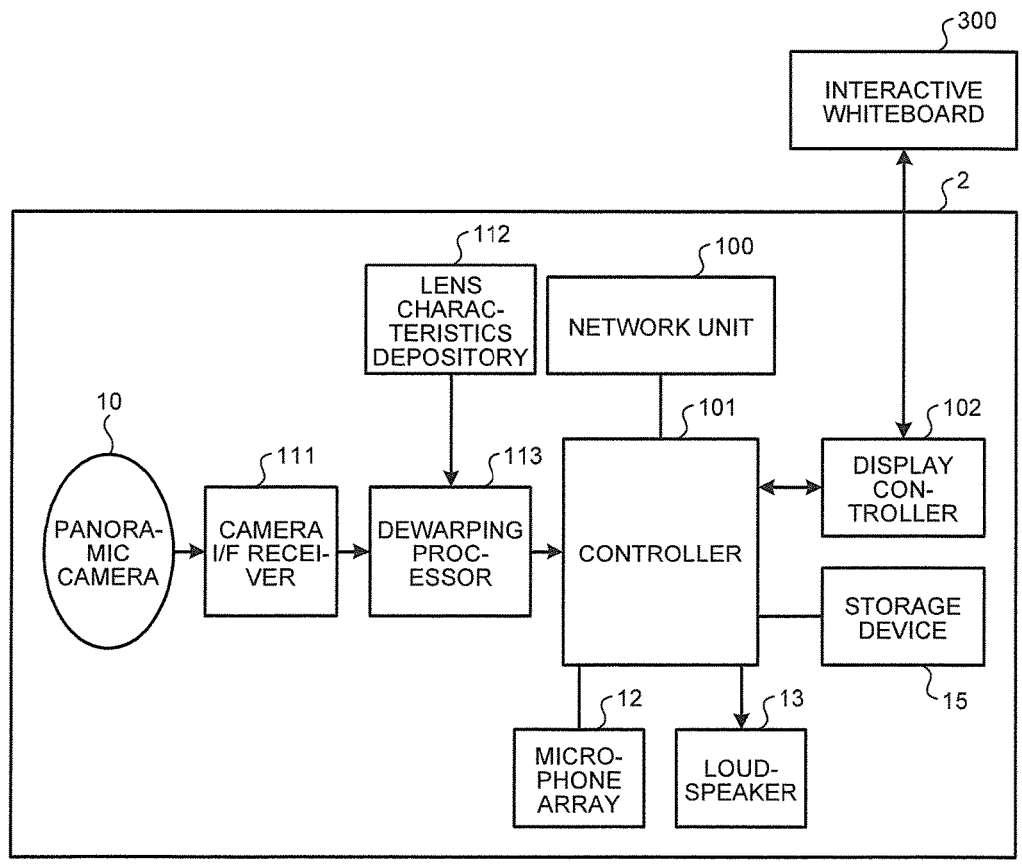
FIG. 4 is a diagram for describing details of the conference terminal.

FIG. 4 is a diagram for describing details of the conference terminal 2. The conference terminal 2 is connected to an interactive whiteboard 300, which is an example of "output device", having a coordinate detection function. In this example, one of the interactive whiteboards 300, which are identical in configuration, are arranged at the site A, while the other one of the interactive whiteboards 300 is arranged at the site B. A display controller 102 has a function of controlling display. In this example, the display controller 102 has not only a function related to drawing on and output to a screen but also a function of acquiring coordinate information, which will be described later, from the interactive whiteboard 300 and passing the acquired coordinate information to a controller 101. Although the interactive whiteboard is used as the output device in this example, any output device, such as a tablet computer, a notebook personal computer, and a touch panel display, having the coordinate detection function may be used as the output device.

The panoramic image created by the panoramic camera 10 is sent to a camera I/F receiver 111. It is assumed that a high-speed serial I/F compliant with the V-by-One (registered trademark) HS standard, the HDMI (registered trademark) standard, or the like is used as the camera I/F receiver 111. After being serial-parallel converted by the camera I/F receiver 111, the panoramic image is dewarped by a dewarping processor 113 and output to the controller 101. Conversion parameters for use in applying dewarping in accordance with lens characteristics are stored in a lens characteristics depository 112. The dewarping processor 113 can dewarp the panoramic image using the conversion parameters.

A network unit 100 exchanges data with another one, i.e., the other party of the conference, of the conference terminals 2.

Figure 5:
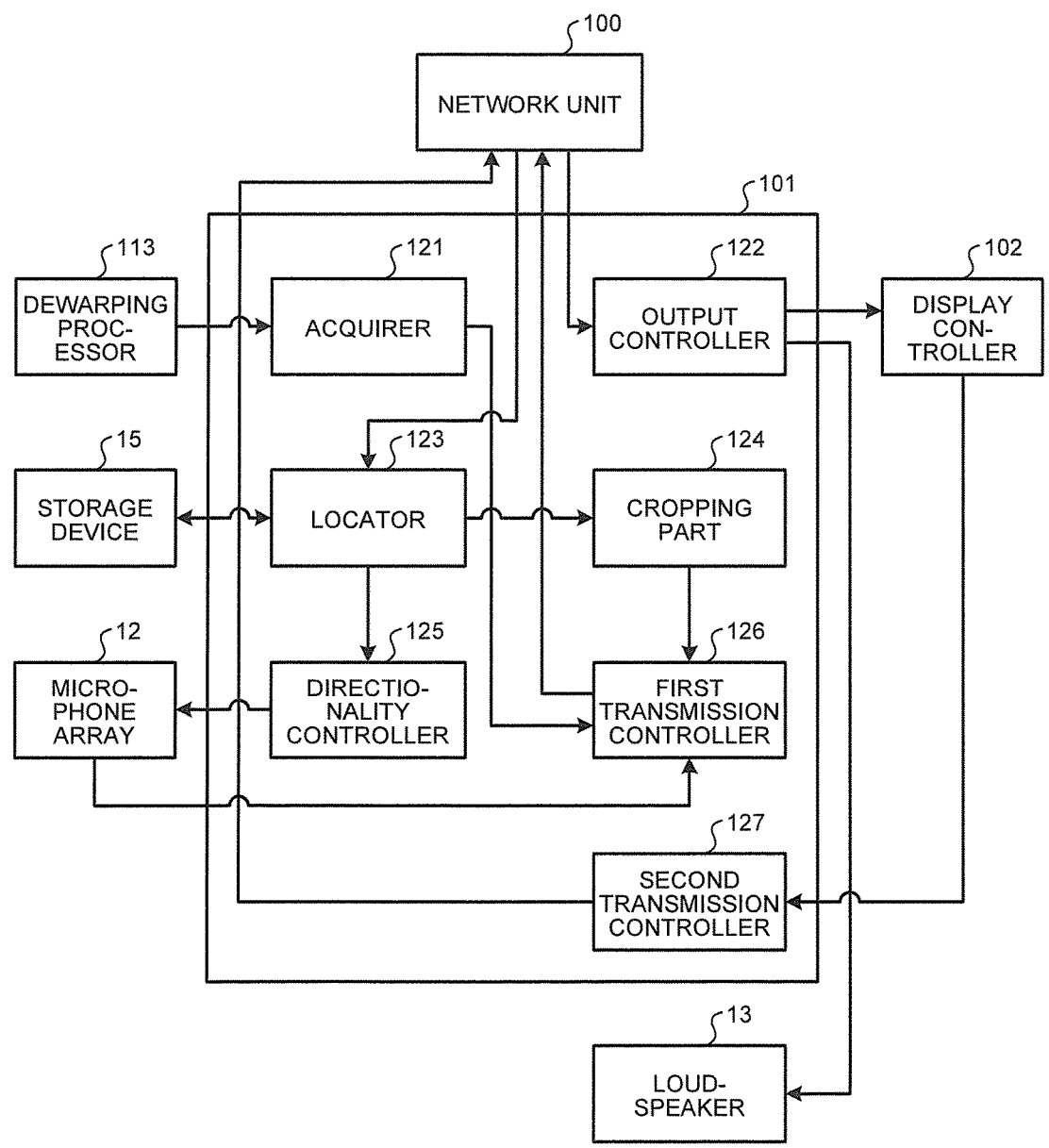
FIG. 5 is a diagram illustrating an example of functions provided by a controller.

The controller 101 is a portion that performs a variety of control and computations and corresponds to the CPU 14. FIG. 5 is a diagram illustrating an example of functions provided by the controller 101. Note that while FIG. 5 mainly illustrates functions related to the present embodiment for convenience of description, functions provided by the controller 101 are not limited to those illustrated.

As illustrated in FIG. 5, the controller 101 includes an acquirer 121, an output controller 122, a locator 123, a cropping part 124, a directionality controller 125, a first transmission controller 126, and a second transmission controller 127.

The acquirer 121 acquires a captured image. More specifically, the acquirer 121 acquires a panoramic image, in which 360-degree surroundings of the conference terminal 2 are captured. In this example, the acquirer 121 acquires a dewarped panoramic image fed from the above-described dewarping processor 113.

The output controller 122 performs control for outputting image data and voice data received from another one, i.e., the other party of the conference, of the conference terminals 2 (hereinafter, sometimes simply referred to "the other conference terminal 2"). Specifically, the output controller 122 performs control for instructing the display controller 102 to cause the interactive whiteboard 300 to display the image data received from the other conference terminal 2 in accordance with a current display mode (which is changeable as desired) of the interactive whiteboard 300 and causing the loudspeaker 13 to output the voice data received from the other conference terminal 2.

When coordinate information representing coordinates of a specified area to be cropped (hereinafter, "crop area"), which is a part of a displayed video displayed on the interactive whiteboard 300 connected to the other conference terminal 2, is received from the other conference terminal 2, the locator 123 locates coordinates on the image (in this example, the panoramic image) corresponding to the received coordinate information based on association information, in which coordinates on the displayed video and coordinates on the captured image (in this example, the panoramic image) are associated. In this example, the association information is stored in the storage device 15 in advance. In a typical video conferencing system, a communication apparatus can change a layout (i.e., can change a display mode) so as to display only a video captured by the apparatus or display only a video captured by a communication apparatus of the other party of the conference. For this reason, coordinates on a displayed video displayed on the interactive whiteboard 300 and coordinates on a captured image (in this example, a panoramic image) are not always in one-to-one correspondence. In consideration of this, in the association information in this example, the coordinates on the displayed video are associated with the coordinates on the captured image (in this example, the panoramic image) for each of display modes (i.e., layout information) of the interactive whiteboard 300.

The cropping part 124 crops an image of an area corresponding to the coordinates on the image (in this example, the panoramic image) located by the locator 123 from the image (in this example, the panoramic image) acquired by the acquirer 121.

The directionality controller 125 controls the directionality of the microphone array 12 so that the directionality of one microphone, to which the coordinates on the image (in this example, the panoramic image) located by the locator 123 are related, of the plurality of microphones mounted and distributed on the conference terminal 2, is focused to a position indicated by the coordinated on the image. In this example, the directionality controller 125 can determine the microphone, to which the coordinates on the image (in this example, the panoramic image) located by the locator 123 are related, based on positional information indicating relationship between the positions of the microphones included in the microphone array 12 and the coordinates on the captured image (in this example, the panoramic image). The positional information may be stored in the storage device 15, for example.

The first transmission controller 126 performs control for transmitting output information containing a cropped image, which is the image cropped by the cropping part 124, and voice captured with the directionality controlled by the directionality controller 125 to the other conference terminal 2. When the above-described coordinate information is not received from the other conference terminal 2, the first transmission controller 126 performs control for transmitting normal conference information containing the image (in this example, the panoramic image) acquired by the acquirer 121, a close-up cropped image obtained by cropping a speaker, who is one of the conference participants captured in the image, and voice data collected by the microphone array 12 to the other conference terminal 2.

In this example, when the normal conference information is received from the other conference terminal 2, the above-described output controller 122 performs control for outputting the received normal conference information. When the above-described output information is received from the other conference terminal 2, the output controller 122 performs control for outputting the received output information.

When the above-described coordinate information is received from the display controller 102 of its own terminal, the second transmission controller 127 performs control for transmitting the received coordinate information to the other conference terminal 2.

The above-described functions (the acquirer 121, the output controller 122, the locator 123, the cropping part 124, the directionality controller 125, the first transmission controller 126, and the second transmission controller 127) provided by the controller 101 may be implemented by the CPU 14 by executing program instructions stored in the storage device 15 or the like. At least a part of the functions provided by the controller 101 may be implemented in a dedicated hardware circuit.

In the example illustrated in FIG. 4, the panoramic camera 10 and the loudspeaker 13 are included in the conference terminal 2. However, their arrangement form is not limited thereto, and the panoramic camera 10 and the loudspeaker 13 may be arranged outside the conference terminal 2.

Figure 6:
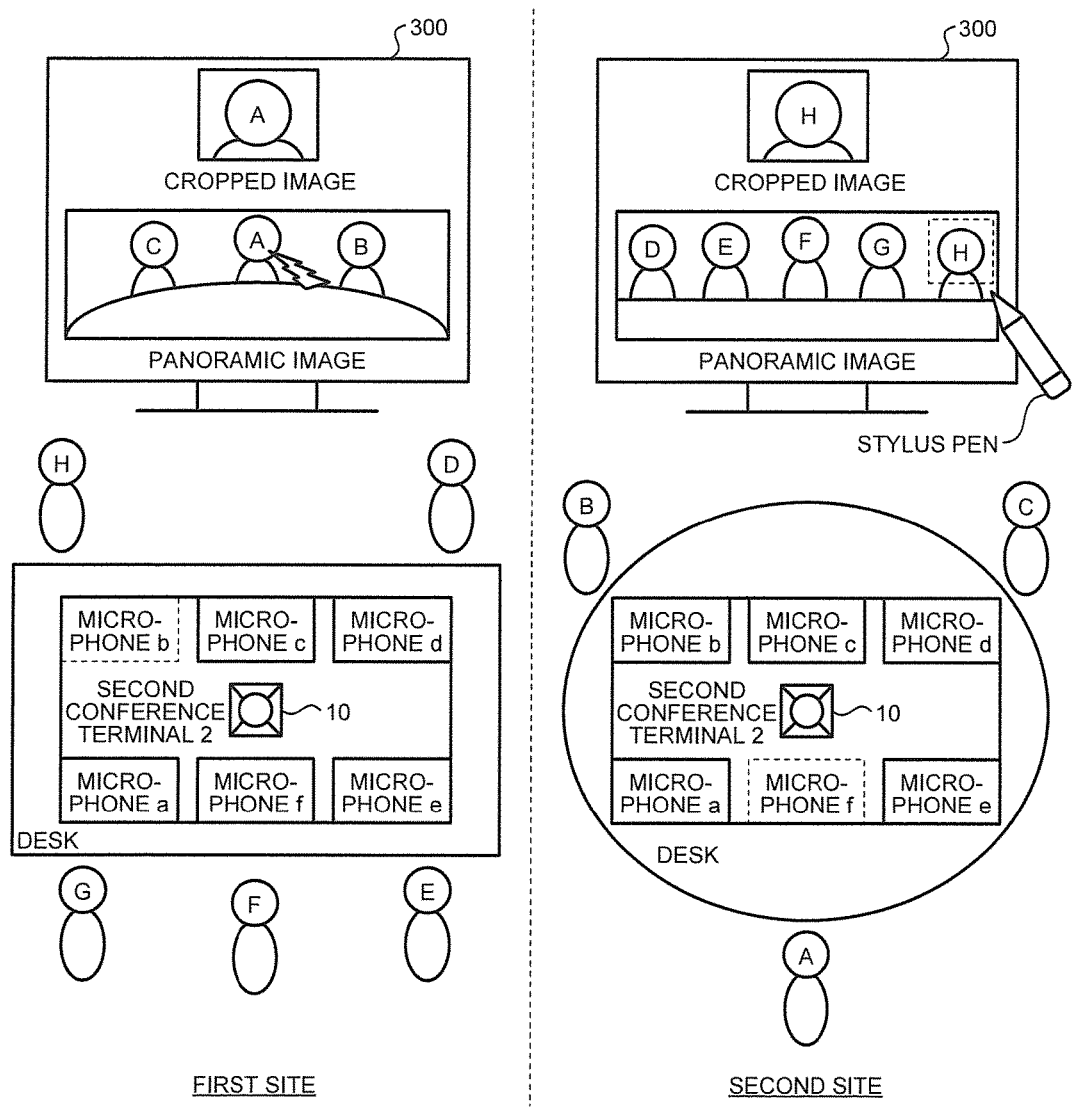
FIG. 6 is a schematic diagram illustrating an example of a scene where a video conference of an embodiment is held.

FIG. 6 is a schematic diagram illustrating an example of a scene where a video conference of the present embodiment is held. At a first site, the conference terminal 2 is placed on a desk. Because the panoramic camera 10 is mounted on the conference terminal 2, it is assumed that the conference terminal 2 is placed at a center of the desk. As described above, the microphone array 12 including the microphones a to f is mounted on the conference terminal 2. Referring to FIG. 6, at the first site, five persons (D to H) are participating in the video conference. The interactive whiteboard 300 described above is arranged at the first site. A video captured at a second site is displayed on the interactive whiteboard 300. A panoramic image, in which all the persons (in this example, persons A to C) participating in the conference from the second site are captured, is displayed in a lower portion of a displayed video displayed on the interactive whiteboard 300. A close-up cropped image of the person A, who is a speaker, is displayed in an upper portion of the displayed video. In a typical video conferencing system having a speaker-tracking function, when any one of conference participants speaks, a close-up cropped image of the speaker is displayed.

Also at the second site, the conference terminal 2 is placed on a desk. As in the first site, because the panoramic camera 10 is mounted on the conference terminal 2, it is assumed that the conference terminal 2 is placed at a center of the desk. The microphone array 12 including the microphones a to f is mounted on the conference terminal 2. Referring to FIG. 6, at the second site, the three persons (A to C) are participating in the video conference. As in the first site, the interactive whiteboard 300 described above is arranged at the second site. A video captured at the first site is displayed on the interactive whiteboard 300. A panoramic image, in which all the persons (in this example, the persons D to H) participating in the conference from the first site are captured, is displayed in a lower portion of a displayed video displayed on the interactive whiteboard 300. In a typical video conferencing system, the cropped image of the speaker will be displayed. By contrast, in the present embodiment, when the area outlined with the dashed line is specified using a stylus pen or the like by any one of the persons participating in the conference from the second site, a cropped image of the specified area is displayed on the displayed video. Specifically, it is possible to display a cropped image of a person that is desired to be zoomed in on the interactive whiteboard 300 at the second site by specifying the area where the person, who is one of the persons captured in the panoramic image, is captured. The subject for the cropped image is not limited to a person. It is possible to cause a cropped image of any subject, to which attention is desired to be directed, to be displayed by specifying an area where the subject, which is one of subjects captured in the panoramic image, is captured.

Figure 7A:
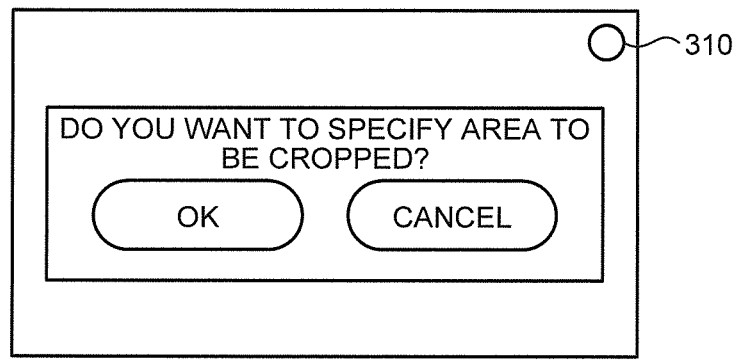
FIG. 7A, FIG. 7B, and FIG. 7C are diagrams for describing a method for specifying a crop area in a displayed video displayed on an interactive whiteboard.
Figure 7B:
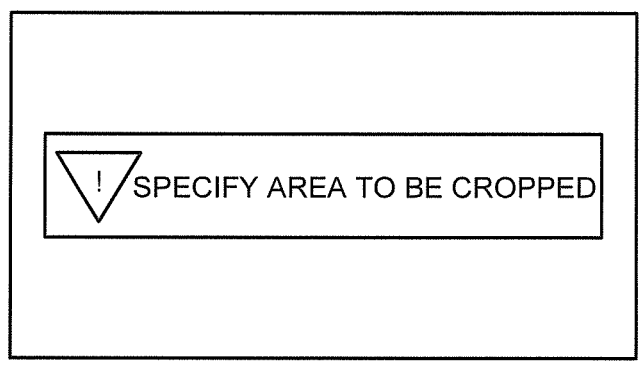
Figure 7C:
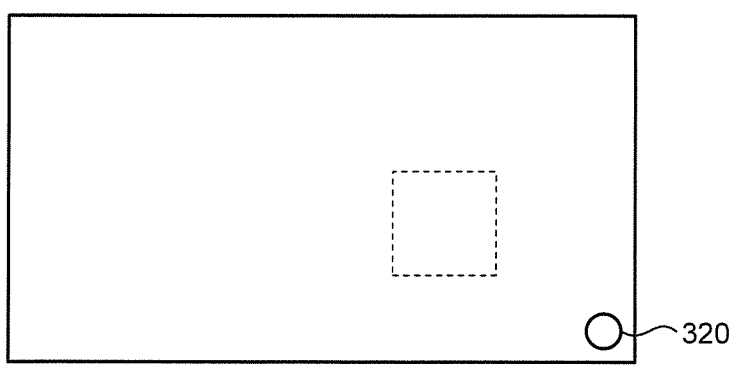

A method for specifying a crop area in a displayed video displayed on the interactive whiteboard 300 is described below with reference to FIG. 7A, FIG. 7B, and FIG. 7C. Upon accepting clicking on a START icon 310, which is for instructing to start specifying a crop area, the interactive whiteboard 300 performs control for displaying such a pop-up screen as that illustrated in FIG. 7A for confirming whether to start specifying a crop area. Upon accepting clicking on the "OK" button on the pop-up screen, the interactive whiteboard 300 performs control for displaying such a message as that illustrated in FIG. 7B for prompting a user to specify the crop area. After the message is displayed, the user can perform an operation for specifying the crop area using a stylus pen or the like. Upon accepting clicking on a FINISH icon 320, which is for instructing to finish specifying the crop area, the interactive whiteboard 300 transmits coordinate information representing coordinates of the specified crop area (the rectangular area outlined with the dashed line in the example illustrated in FIG. 7C) in a displayed video displayed on the interactive whiteboard 300 to the conference terminal 2. The conference terminal 2 performs control for transmitting the coordinate information received from the interactive whiteboard 300 to the other conference terminal 2 of the other party of the conference.

Figures 8, 9:
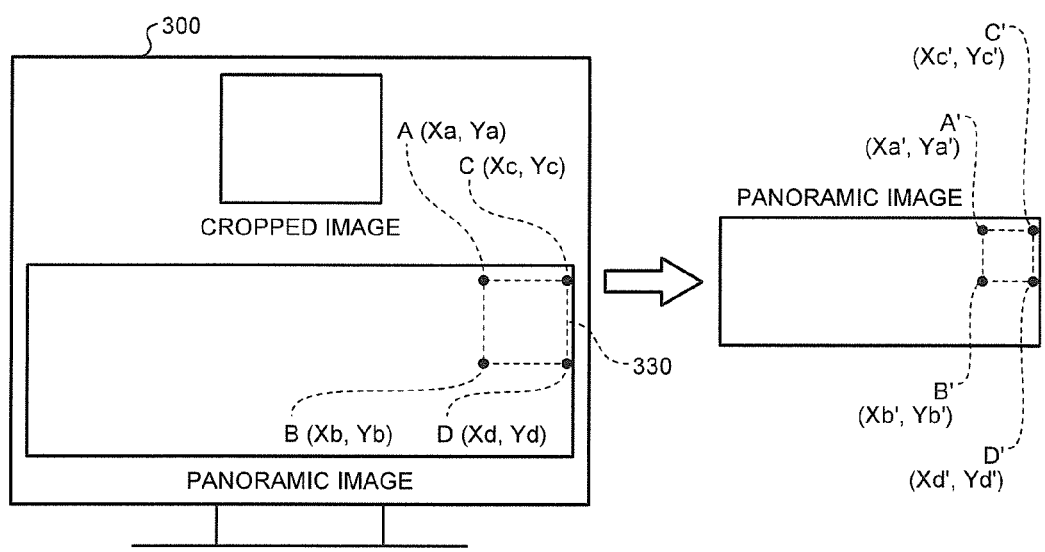
FIG. 8 is a diagram for describing a specific example of the embodiment.
FIG. 9 is a diagram for describing the specific example of the embodiment.

Assume that, as illustrated in FIG. 8, an area 330, in which the person H is captured, is specified as a crop area in the display video displayed on the interactive whiteboard 300 at the second site. In this example, the area 330 is a rectangular area; coordinate information about the area 330 is information representing coordinates of the four vertexes (A, B, C, and D) of the area 330. In this example, the coordinates of the vertex A on the displayed video are (Xa,Ya); the coordinates of the vertex B are (Xb,Yb); the coordinates of the vertex C are (Xc,Yc); and the coordinates of the vertex D are (Xd,Yd). The coordinate information is transmitted to the conference terminal 2 at the first site.

The conference terminal 2 at the first site locates coordinates, which correspond to the coordinate information received from the conference terminal 2 at the second site, on the panoramic image based on the association information, in which the coordinates on the displayed video are associated with the coordinates on the panoramic image. In this example, the point, on the panoramic image acquired by the conference terminal 2 at the first site, corresponding to the vertex A on the displayed video displayed on the interactive whiteboard 300 at the second site is denoted as "A'", the point corresponding to the vertex B is denoted as "B'", the point corresponding to the vertex C is denoted as "C'", and the point corresponding to the vertex D is denoted as "D'". FIG. 9 is a diagram illustrating relationship between the coordinates of the vertexes A, B, C, and D on the displayed video and the coordinates of the points A', B', C', and D' on the panoramic image. The conference terminal 2 at the first site locates the coordinates on the panoramic image corresponding to the coordinate information received from the conference terminal 2 at the second site, and crops an image of an area corresponding to the located coordinates from the panoramic image as a cropped image. In this example, as illustrated in FIG. 8, the conference terminal 2 at the first site crops an image of a rectangular area defined by the coordinates (Xa',Ya') of the point A', the coordinates (Xb',Yb') of the point B', the coordinates (Xc',Yc') of the point C', and the coordinates (Xd',Yd') of the point D' from the panoramic image acquired by the panoramic camera 10 of its own terminal as a cropped image. Furthermore, the conference terminal 2 at the first site controls the directionality of the microphone array 12 so that the directionality of the microphone arranged closest to the located coordinates on the panoramic image is focused to a position indicated by the located coordinates on the panoramic image, based on the positional information indicating the relationship between the positions of the microphones included in the microphone array 12 and the coordinates on the panoramic image.

The conference terminal 2 at the first site transmits output information containing the cropped image cropped out as described above and the voce captured with the controlled directionality to the conference terminal 2 at the second site. The conference terminal 2 at the second site outputs the output information received from the conference terminal 2 at the first site. Hence, a cropped close-up image of the person H is displayed at the second site.

Figure 10:
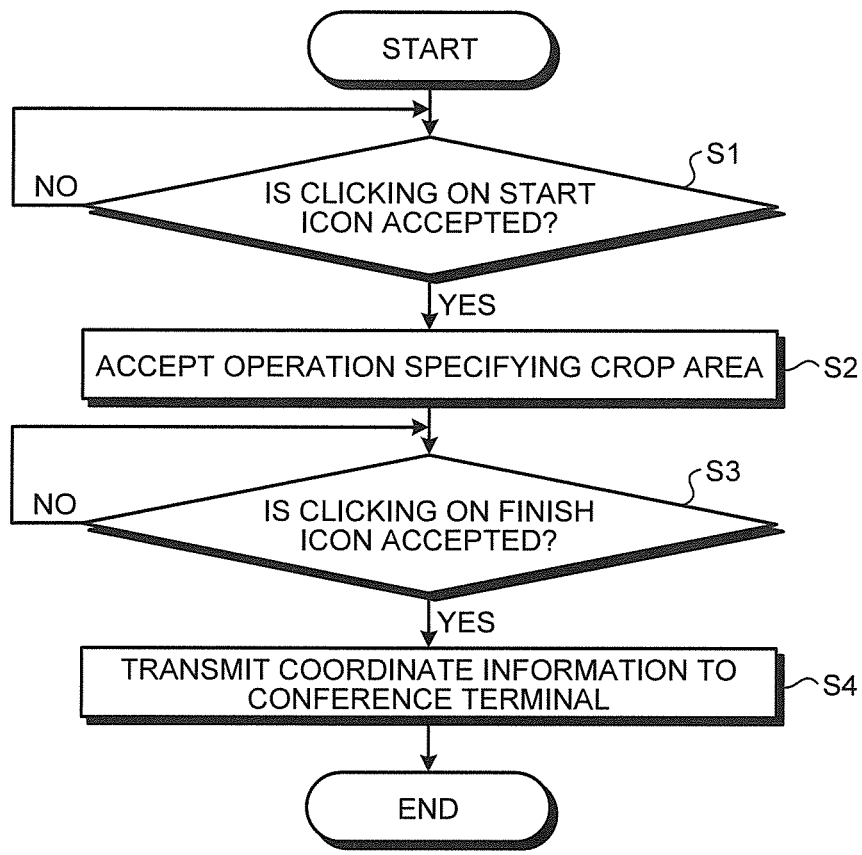
FIG. 10 is a flowchart illustrating an example operation of the interactive whiteboard.

FIG. 10 is a flowchart illustrating an example operation of the interactive whiteboard 300 for specifying a crop area. Upon accepting clicking on the START icon 310 (Yes at step S1), the interactive whiteboard 300 accepts an operation specifying a crop area (step S2). Upon accepting clicking on the FINISH icon 320 (Yes at step S3), the interactive whiteboard 300 transmits coordinate information representing coordinates of the specified crop area to the conference terminal 2 (step S4).

Figure 11:
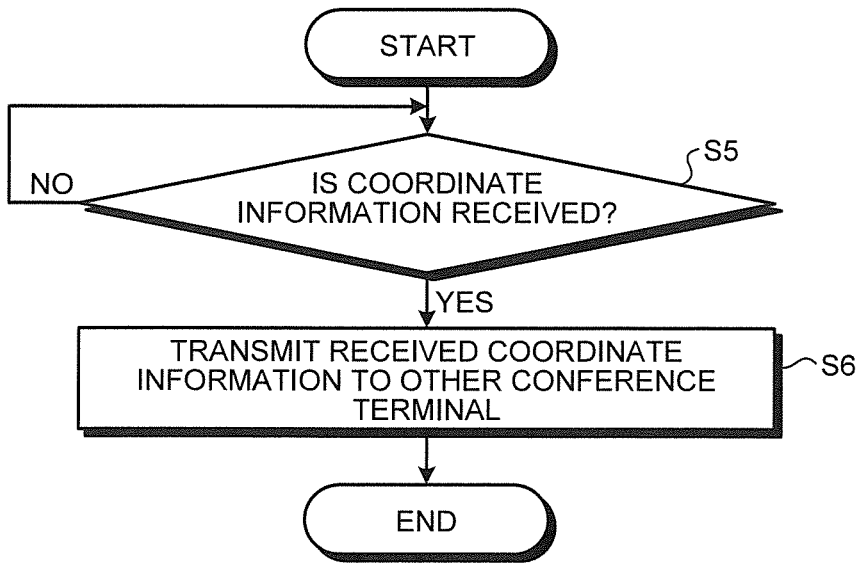
FIG. 11 is a flowchart illustrating an example operation of the conference terminal.

FIG. 11 is a flowchart illustrating an example operation of the conference terminal 2 in a situation where the conference terminal 2 receives coordinate information from the interactive whiteboard 300 connected to the conference terminal 2. Upon receiving the coordinate information (Yes at step S5), the second transmission controller 127 performs control for transmitting the received coordinate information to the other conference terminal 2 (step S6).

Figure 12:
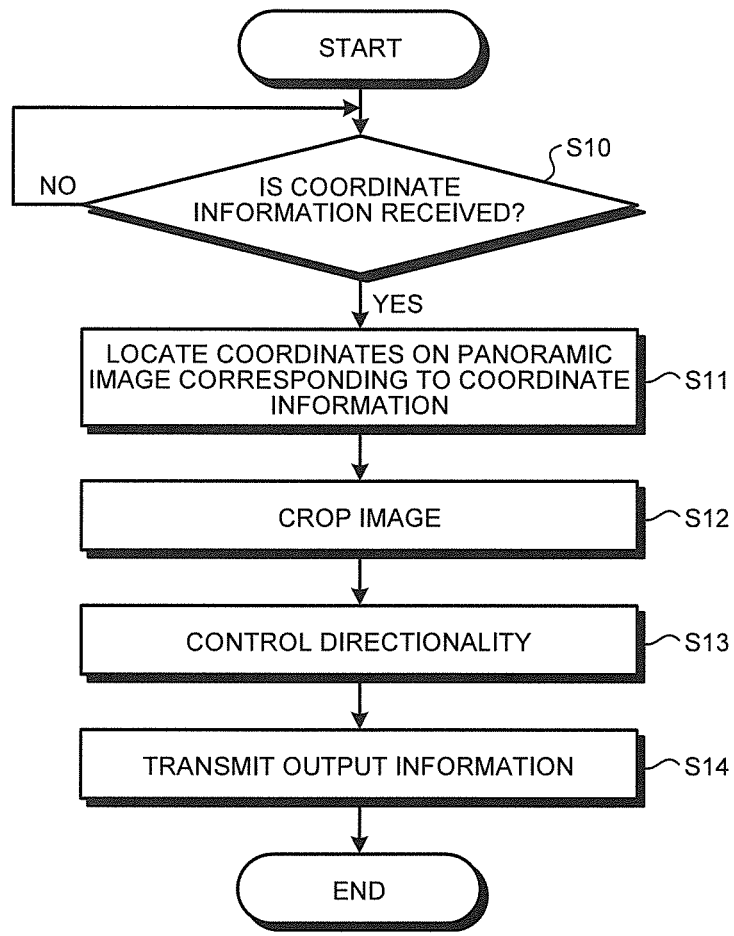
FIG. 12 is a flowchart illustrating an example operation of the conference terminal.

FIG. 12 is a flowchart illustrating an example operation of the conference terminal 2 in a situation where the conference terminal 2 receives coordinate information from the other conference terminal 2. Upon receiving coordinate information from the other conference terminal 2 (Yes at step S10), the locator 123 locates coordinates on the panoramic image corresponding to the received coordinate information (step S11). Thereafter, the cropping part 124 crops an image of an area corresponding to the located coordinates on the panoramic image located at S11 from a panoramic image acquired from the panoramic camera 10 mounted on its own terminal (step S12). Thereafter, the directionality controller 125 controls the directionality of the microphone array 12 so that the directionality of one microphone, to which the coordinates on the panoramic image located at step S11 are related, of the plurality of microphones mounted and distributed on the conference terminal 2, is focused to a position indicated by the coordinates on the image (step S13). The first transmission controller 126 performs control for transmitting output information containing a cropped image, which is the image cropped at step S12, and voice captured with the directionality controlled at step S13 to the other conference terminal 2 (step S14).

Figure 13:
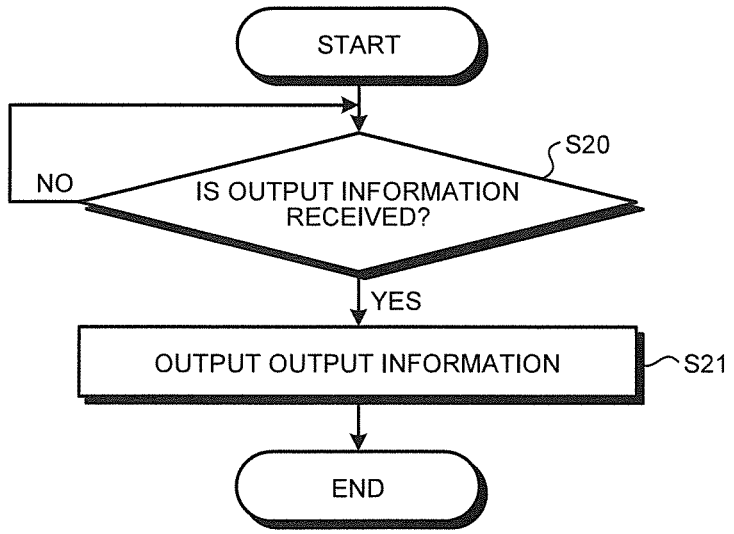
FIG. 13 is a flowchart illustrating an example operation of the conference terminal.

FIG. 13 is a flowchart illustrating an example operation of the conference terminal 2 in a situation where the conference terminal 2 receives output information from the other conference terminal 2. Upon receiving output information from the other conference terminal 2 (Yes at step S20), the output controller 122 performs control for outputting the received output information (step S21). Specifically, the output controller 122 performs control for displaying the cropped image contained in the output information on the interactive whiteboard 300 and control for outputting the voice contained in the output information from the loudspeaker 13.

As described above, the conference terminal 2 of the present embodiment operates as follows. Upon receiving the above-described coordinate information from the other conference terminal 2 of the other party of the conference, the conference terminal 2 locates the coordinates on the panoramic image corresponding to the received coordinate information based on the association information, in which the coordinates on the displayed video and the coordinates on the panoramic image are associated, and crops an image of an area corresponding to the located coordinates on the panoramic image from the panoramic image as a cropped image. The conference terminal 2 controls the directionality of the microphone array 12 so that the directionality of one microphone, to which the located coordinates on the panoramic image are related, of the plurality of microphones mounted and distributed on the conference terminal 2, is focused to a position indicated by the coordinates on the image. The conference terminal 2 transmits output information containing the cropped image and the voice captured with the controlled directionality to the other conference terminal 2. The other conference terminal 2 outputs the received output information. Hence, outputting the video and the voice desired from the other conference terminal 2 can be achieved. In the present embodiment, the panoramic camera whose image capture range is 360 degrees is used. However, the gist of the present invention lies in specifying a part of a captured image as a crop area and controlling the area and directionality of microphones. Accordingly, the angle of view, or the image capture range, of the camera may be approximately 80 degrees.

The program instructions to be executed by the above-described conference terminal 2 may be configured to be provided as an installable file or an executable file recorded in a computer-readable recording medium, such as a CD-ROM (compact disc-read-only memory), a flexible disk (FD), a CD-R (compact disc recordable), a DVD (Digital Versatile Disk), and a USB (Universal Serial Bus) memory. The program instructions may alternatively be configured to be provided or delivered via a network, such as the Internet. Various program instructions may be configured to be provided in a state preinstalled in a ROM or the like.

According to an aspect of the present invention, it is possible to provide an image and voice desired from a communication apparatus of the other party in mutual communication.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A communication terminal comprising:
   a capturer configured to capture an image;
   an acquirer configured to acquire the captured image from the capturer;
   a locator configured to, upon receiving coordinate information representing coordinates of a specified area from another communication terminal in communica- tion with the communication terminal, the specified area being a part of a displayed video displayed on an output device connected to the other communication terminal, locate coordinates on the image corresponding to the coordinate information based on association information, in which coordinates on the displayed video and coordinates on the image are associated;

a cropping part configured to crop, from the image, a cropped image of the area specified by the coordinates, on the image located by the locator;

a microphone array including a plurality of microphones arranged in a cabinet of the communication terminal along a lateral direction when viewed from the capturer;

a directionality controller configured to control directionality of the microphone array including the plurality of microphones so that the directionality of one microphone, to which the coordinates on the image located by the locator are related, amongst the plurality of microphones, is focused to a position indicated by the coordinates on the image; and a first transmission controller configured to perform control for transmitting output information containing (i) the cropped image cropped by the cropping part, and (ii) voice captured with the directionality controlled by the directionality controller, to the other communication terminal.

2. The communication terminal according to claim 1, wherein the association information is information, in which coordinates on the displayed video are associated with coordinates on the image for each of display modes of the output device.

3. The communication terminal according to claim 1, wherein the directionality controller determines the one microphone, to which the coordinates on the image located by the locator are related, based on positional information indicating relationship between positions of the microphones included in the microphone array and the coordinates on the image.

4. The communication terminal according to claim 1, wherein the image is a panoramic image created by combining a plurality of images.

5. A communication method to be performed by a communication terminal, the communication method comprising:

(a) acquiring a captured image captured by a capturer of the communication terminal;

(b) locating, upon receiving coordinate information representing coordinates of a specified area from another communication terminal in communication with the communication terminal, the specified area being a part of a displayed video displayed on an output device connected to the other communication terminal, coordinates on the image corresponding to the coordinate information based on association information, in which coordinates on the displayed video and coordinates on the image are associated;

(c) cropping, from the image, a cropped image of an area defined by the coordinates on the image located in (b);

(d) controlling directionality of a microphone array including a plurality of microphones arranged in a cabinet of the communication terminal along a lateral direction when viewed from the capturer so that the directionality of one microphone, to which the coordinates on the image located in (b) are related, of the plurality of microphones, is focused to a position indicated by the coordinates on the image; and (e) performing control for transmitting output information containing the cropped image cropped in (c), and voice captured with the directionality controlled in (d), to the other communication terminal.

6. A communication system comprising:

a first communication terminal; and a second communication terminal configured to exchange data with the first communication terminal, the first communication terminal including a capturer configured to capture an image, an acquirer configured to acquire a captured image from the capturer, a locator configured to, upon receiving coordinate information representing coordinates of a specified area from the second communication terminal, the specified area being a part of a displayed video displayed on an output device connected to the second communication terminal, locate coordinates on the image corresponding to the coordinate information based on association information indicating association relationship between coordinates on the displayed video and the coordinates, a cropping part configured to crop, from the image, a cropped image of an area defined by the coordinates on the image located by the locator, a directionality controller configured to control directionality of a microphone array including a plurality of microphones arranged in a cabinet of the first communication terminal along a lateral direction when viewed from the capturer so that the directionality of one microphone, to which the coordinates located on the image by the locator are related, amongst the plurality of microphones, is focused to a position indicated by the coordinates on the image, and a first transmission controller configured to perform control for transmitting output information containing (i) the cropped image cropped by the cropping part, and (ii) voice captured with the directionality controlled by the directionality controller, to the second communication terminal, and the second communication terminal including a second transmission controller configured to perform control for transmitting the coordinate information to the first communication terminal, and an output controller configured to perform control for outputting the output information received from the first communication terminal.

7. The communication terminal according to claim 1, wherein the microphone array including the plurality of microphones is arranged in a fixed positional relationship relative to the capturer.

8. The communication terminal according to claim 1, wherein each microphone amongst the plurality of microphones in the microphone array is an omnidirectional microphone and is arranged in a fixed positional relationship relative to the capturer.

* * * * *